United States Patent [19]

Freestone

[11] 3,950,780

[45] Apr. 13, 1976

[54] VIR CHROMA SYSTEM

[75] Inventor: Harry T. Freestone, Portsmouth, Va.

[73] Assignee: General Electric Company, Portsmouth, Va.

[22] Filed: Aug. 23, 1974

[21] Appl. No.: 500,082

[52] U.S. Cl. .............................................. 358/28
[51] Int. Cl.$^2$......................................... H04N 9/12
[58] Field of Search......................... 358/10, 27, 28; 178/69.5 CB

[56] References Cited
UNITED STATES PATENTS

| | | | |
|---|---|---|---|
| 3,673,320 | 6/1972 | Carnt et al. | 358/10 |
| 3,755,617 | 8/1973 | Ichida | 358/28 |
| 3,780,218 | 12/1973 | Rennick | 358/10 |

Primary Examiner—Robert L. Richardson

[57] ABSTRACT

A reference signal contained in the vertical blanking interval of the transmitted television signal is used in the color television receiver for automatic hue and saturation control. This vertical interval reference (VIR) signal includes a chrominance reference portion and a black level reference portion. The chrominance reference portion contains hue indicative information in that one of the color difference signals is zero and saturation indicative information in that one of the color signals is zero. The receiver is responsive to the VIR signal once during the black level reference portion to establish a zero reference for the hue control circuit and for the saturation control circuit. The receiver is responsive to the VIR signal a second time during the chrominance reference portion to set proper hue and saturation by automatically reducing to zero any differences between the indication of hue and saturation obtained from the VIR chrominance reference portion and the established zero references.

12 Claims, 5 Drawing Figures

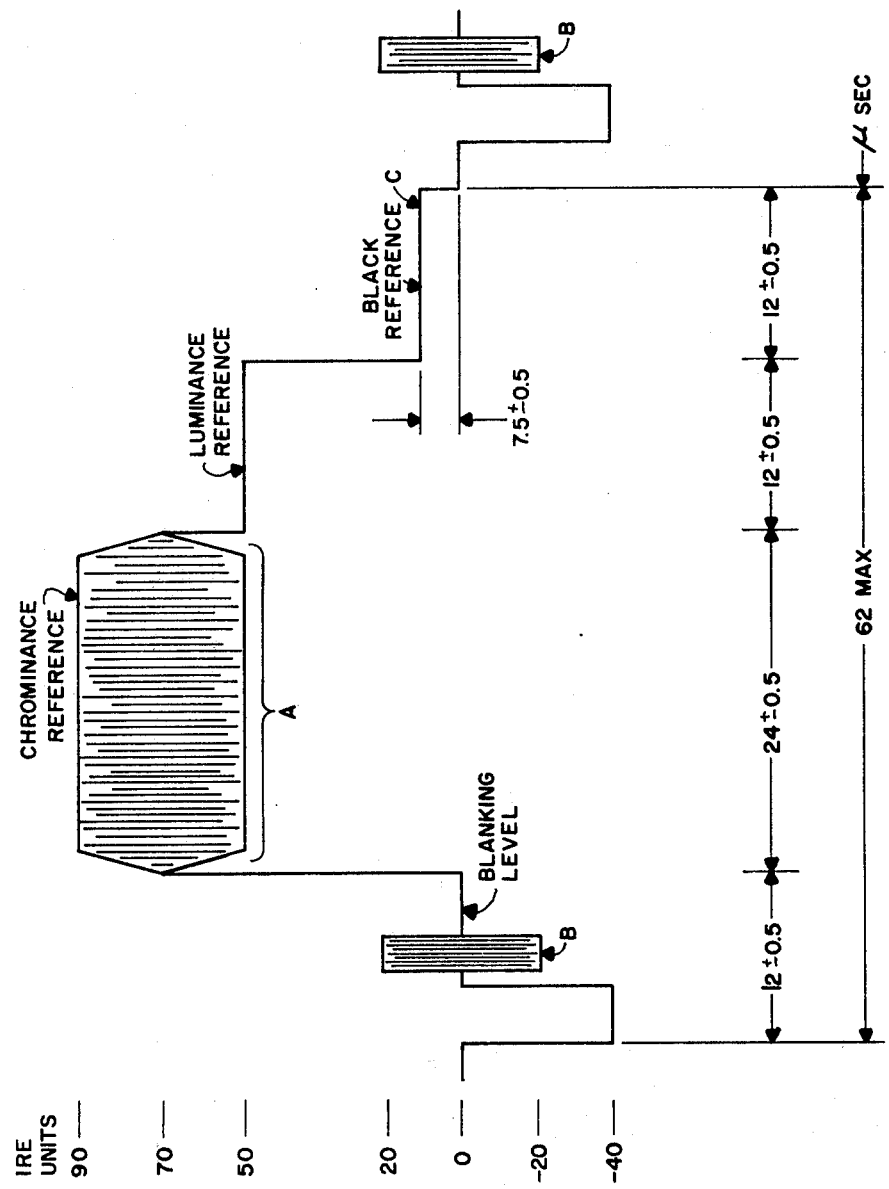

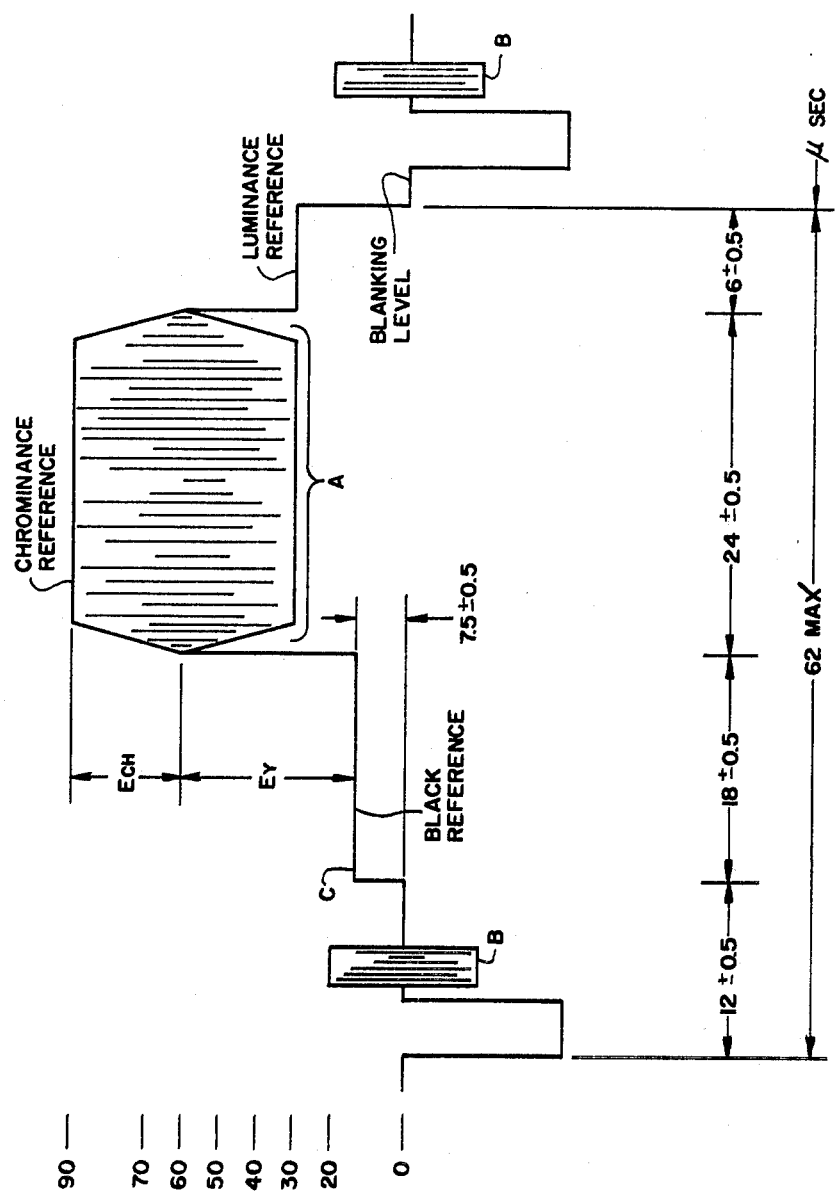

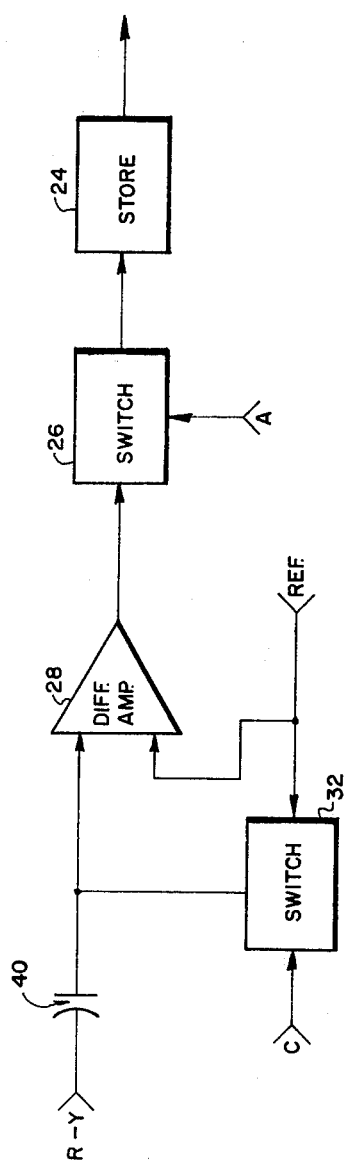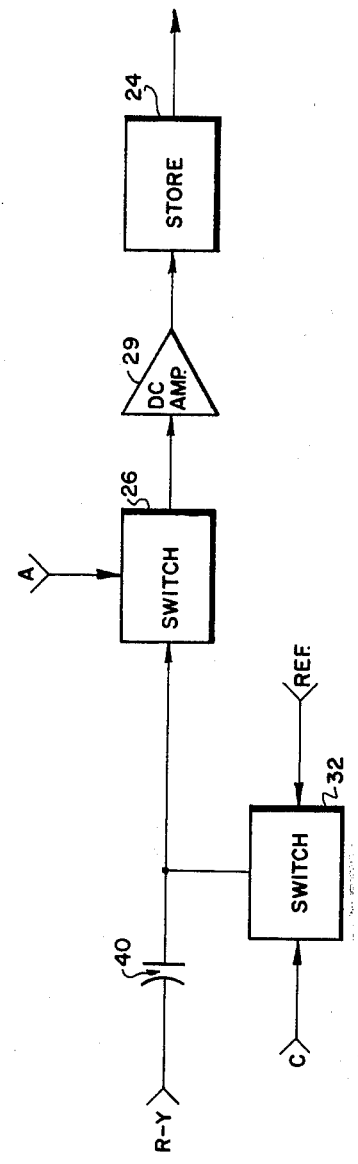
FIG. 3
FIG. 4

VIR CHROMA SYSTEM

BACKGROUND OF THE INVENTION

The present invention relates to automatic chroma control circuitry for a color television receiver in which a reference signal containing unique hue and saturation information is relied upon for automatically establishing correct hue and saturation in the displayed image.

The invention relates to control circuits of the type set forth in U.S. Pat. No. 3,673,320 issued to Carnt et al., June 27, 1972 and entitled Television Apparatus Responsive to a Transmitted Color Reference Signal. The Carnt et al. patent shows a possible form of a VIR signal and its use in a color television receiver to automatically obtain proper hue and saturation setting in the image displayed. The Carnet et al. patent is directed generally to the use of a VIR signal for automatic chroma control. However, assumptions are made in the teachings of this patent that leave problems to be solved in order to implement the practical design of a receiver. First, it is assumed that a suitable reference corresponding to the zero level of the color difference detector is applied to the hue control circuit and a suitable reference corresponding to the zero level of the blue amplifier is applied to the saturation control circuit, although no such references are shown or described. Secondly, it is assumed that the circuitry responsive to the VIR signal which establishes the zero hue information and the zero saturation information does not drift. Thirdly, it is assumed that whatever reference level is used is free from drift.

It is known that feedback type control circuits require a suitable reference signal. It is also known that the circuit elements employed in today's television receivers are subject to drift due to temperature and age. In addition, if the reference employed in the hue and saturation control circuits drifts unacceptable color rendition will result.

Another patent which deals with the use of a VIR signal for automatic hue control in a color television receiver is U.S. Pat. No. 3,780,218, issued to John Rennick, Dec. 18, 1973 and entitled Circuit for Establishing Correct Hue Setting in Color Television Using VIR Signal. Unlike the Carnt et al. patent Rennick shows the use of a reference in his hue control circuit and does show the VIR signal currently being considered for adoption by the Federal Communication Commission. Rennick like Carnt et al., however, fails to acknowledge the drift problems with present day receiver circuits components and fails to utilize the reference contained in the VIR signal to correct for such drift problems.

Both the Carnt et al. patent and the Rennick patent deal with the proposition that when the phase of the chrominance reference portion of the VIR signal is the phase of one transmitted color difference signal then the other color difference signal is zero. Thus, if the phase of the chrominance reference is $-(B-Y)$ then the $R-Y$ detector output should be zero, i.e., the detector should have the same output that it has when no chroma is transmitted. This unique characteristic permits the use of a feedback control circuit to set the hue of the receiver by automatically adjusting the tint control so that the $R-Y$ detector indication is zero. Carnt et al. further teach that specific luminance to chrominance proportioning of the chrominance reference creates the condition where one of the color signals is zero. Specifically, if the phase of the chrominance reference is $-(B-Y)$ and the ratio of luminance to chrominance amplitudes is 2.03 then the blue signal should be detected as zero, i.e., the detector should have the same output level that it has during black level transmission. Accordingly, proper setting of the saturation of the displayed image for each luminance setting is realized by use of an automatic control circuit to adjust the chroma gain until the blue signal indication is zero.

The aforementioned drift problems with the prior art in the practical utilization of a VIR signal for automatic chroma control are solved by the present invention. First, it was discovered that the VIR signal proposed to the Federal Communication Commission in Docket 19907 and presently being considered for adoption is much more suitable for practical utilization in a receiver than the signal format shown in the aforementioned Carnt et al. patent. The signal format being considered is identical to that shown in the Rennick patent and unlike the Carnt et al VIR signal format includes a black reference signal level which, according to the present invention provides the opportunity to determine and update the hue null and saturation null references. The present invention contemplates double interrogation of the VIR signal, a first time during the black level reference interval to obtain a measure of a zero reference for the two automatic control and a second time during the chroma reference interval to correct the hue and saturation setting of the receiver by a comparison of the hue and saturation indications from the chroma reference with the measured zero reference. In this manner, a continually updated reference for correct hue and saturation is made readily available. Drift problems not considered by either Carnt et al. or Rennick, namely drift in the $R-Y$ detector output or drift in the loop reference, are overcome by the present invention by the periodic updating of the loop reference.

It is accordingly an object of the present invention to provide a practical automatic chroma control circuit for a color television receiver which is insensitive to drift problems.

Another object of the present invention is to employ double interrogation of the VIR signal to realize properly referenced automatic hue and saturation control circuits for a color television receiver.

These and other objects are generally realized in the preferred embodiment by the provision in the hue control circuit (the saturation control circuit may be substantially identical to the hue control circuit of a first switch operative during the black level reference portion of the VIR signal to apply the output of the $R-Y$ detector to a storage circuit. The $R-Y$ output present during this interval is stored as the hue null reference. This hue null reference is applied to one input terminal of a differential amplifier, the second input terminal of which is coupled directly to receiver the $R-Y$ output. Thus, when the feedback control circuit is closed by a second switch during the chroma reference portion of the VIR signal, any differential existing at the input of the differential amplifier is reduced to zero by automatic control of the phase of the regenerated subcarrier. In this manner the hue setting of the receiver is updated during each receipt of the VIR signal.

A better understanding of the present invention may be had from the following detailed description taken in conjunction with the drawings, in which FIG. 1A is a representation of the waveform of the proposed VIR signal;

FIG. 1B is a representation of the waveform of an alternate VIR signal particularly suitable for the present invention;

FIG. 3 is a partially block and partially circuit diagram of another embodiment of the present invention; and FIG. 4 is a partially block and partially circuit diagram of a still further embodiment of the present invention.

DETAILED DESCRIPTION

Figure 2:
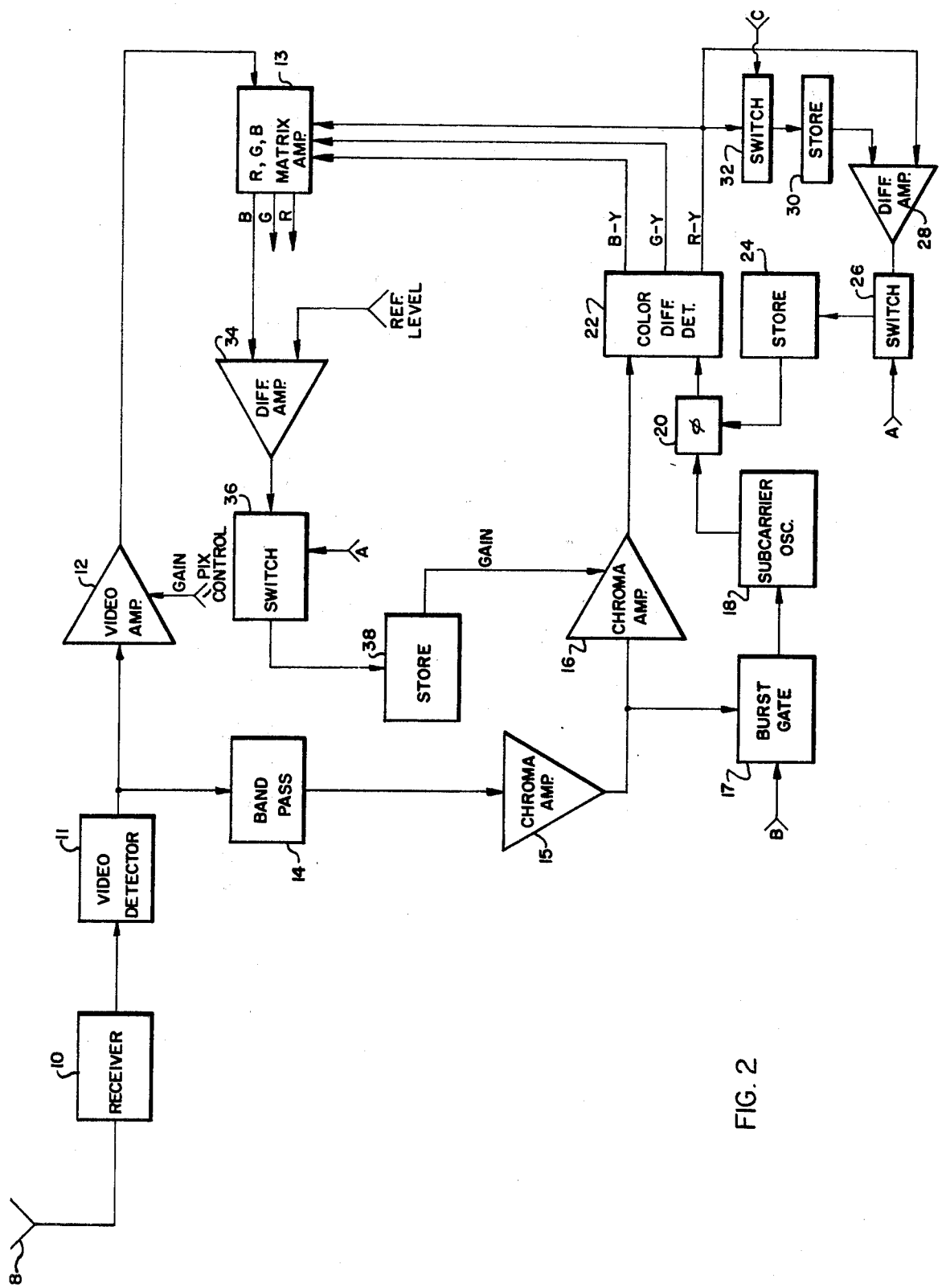
FIG. 2 is a block diagram of a portion of a color television receiver incorporating automatic hue and saturation control circuits in accordance with the present invention.

Referring now to FIG. 1A there is illustrated the waveform of the proposed VIR signal being considered for adoption by the Federal Communication Commission. As proposed, this signal would appear on line 19 in each of the field, line 19 being one of the several unused horizontal lines during the vertical flyback or blanking interval. The VIR signal shown in FIG. 1A is comprised of a horizontal synchronizing pulse of 40 IRE units amplitude in a negative direction followed by a color burst signal also having an amplitude of 40 IRE units extending between +20 and −20 about the blanking level at 0 IRE units. The time of the occurrence of the burst signal is designated B in the Figure. Occurring approximately 12 microseconds after the beginning of the VIR signal is the chrominance reference portion which as proposed has the same phase as the burst signal and comprises unmodulated 3.58 MH$_2$ subcarrier frequency extending approximately for 24 microseconds. It is noted that the chrominance reference extending from +50 to +90 IRE units sits on a luminance pedestal of 70 IRE units. As discussed previously, with the chrominance reference at the phase of the burst which is −(B−Y) the R−Y color difference signal at this time is zero due to the quadrature phase relationship between these two signals. Thus, the chrominance reference provides a unique designation (R−Y = 0) for establishing the hue in the color television receiver. The time of the occurrence of the chrominance reference portion of the VIR signal is designated A. It is followed by the luminance reference portion which extends for approximately 12 microseconds and then by a black reference level indication also approximately of 12 microseconds, the timing of which is designated C.

Referring now to FIG. 1B, there is shown a slightly modified version of the VIR signal particularly suitable for the present invention. First of all, it is noted that the black level reference portion of the signal preceeds the chrominance reference portion and extends for 18 microseconds instead of the 12 microseconds. The blanking level at the end of the VIR signal is shortened accordingly to 6 microseconds. The purpose for having the black reference preceed the chrominance reference will be described below.

Another change in the VIR signal depicted in FIG. 1B is a slight modification in the chrominance and/or luminance levels such that the luminance amplitude to chrominance amplitude ratio is 2.03. With this relationship it can be readily shown from the equation specifying the makeup of a color signal that the chrominance reference will represent a saturated yellow-green hue, i.e. one having an absence of blue. One such possible arrangement is shown in FIG. 1B in which the luminance amplitude is approximately 60 IRE units and the chrominance amplitude is 30 IRE units.

As discussed by Carnt et al., if the phase of the chrominance reference is selected to be R−Y instead of B−Y then the B−Y color difference signal would be zero, and if, in addition the luminance to chrominance ratio is 1.14, the chrominance reference represents a saturated blue-green hue, so that the red signal is zero. Thus, it should be recognized that although the following discussion, which is limited to mention of the R−Y and blue signals only, the invention is not so limited.

Referring now to FIG. 2 there is shown a block diagram of those elements of a color television receiver necessary for an understanding of the present invention. In the upper left hand corner of the Figure the input signal processing circuitry of the receiver is shown by a block 10 having an input antenna 8 connected thereto for receiving the broadcast signal. The output of the receiver is applied to a video detector 11 which supplies a signal indicative of the video received to video amplifier 12 which has a transfer characteristic such that only the luminance portion of the video is passed to matrix amplifier 13. The video signal is also applied to bandpass circuit 14 which passes only the chrominance portion of the video to first chroma amplifier 15. The output of chroma amplifier 15 is applied both to the second chroma amplifier 16 and to burst gate 17. The burst gate 17 is shown activated by a timing pulse B which occurs at the time of the burst portion of the video signal. Thus, only the burst signal is passed by gate 17 to subcarrier oscillator 18 which is thereby locked in frequency to the frequency of the burst signal. The regenerated subcarrier signal is then applied to the color difference detector 22 by means of phase shift circuit 20. The chrominance signal, comprising the color difference signals modulated on the subcarrier is applied to the color difference detector by chroma amplifier 16 so that the detected color difference signals B−Y, G−Y and R−Y are obtained from the color difference detector 22. These color difference signals are applied to the RGB matrix amplifier 13 where they are combined with the luminance signal, applied to the matrix amplifier by video amplifier 12, so that the color signals R, G and B are produced for application to the picture tube (not shown).

Thus far, the elements of the color television receiver described are those ordinarily found in a color television receiver. It is noted that the video amplifier 12 has a gain input identified as a picture control which in many color television receivers is brought outside the cabinet of the receiver as a control of the contrast of the image displayed. Also the phase adjusting circuit 20, which adjusts the phase of the subcarrier oscillator, is ordinarily brought out as a tint control. It is also noted that in many receivers currently being produced the control of the contrast is ganged in some fashion to the control of the chroma gain so that an increase in video drive or contrast of the image also produces an increase in the saturation or chroma gain of the image. The point of control of the chroma gain is the gain input of chroma amplifier 16.

DETAILED DESCRIPTION OF PREFERRED EMBODIMENT

If the tint control i.e., the phase of the regenerated subcarrier is proper during the receipt of the chrominance reference portion of the VIR signal, the R—Y output of the color difference detector 22 will indicate zero signal level. This R—Y output of detector 22 is directly applied to one input of a differential amplifier 28 and is also applied to a storage circuit by means of a switch 32. The switch 32 is activated by a timing pulse indicated as C coincident with the timing of the black reference in FIGS. 1A and 1B. In order for the tint control feedback loop to set the R—Y output during the chrominance reference at the desired zero point, a reference is required which designates that zero point. Thus, if the R—Y output is examined during receipt of zero color information such as a black reference level, the luminance reference level or the blanking level, the indication obtained from the output of the color difference detector at this time is an indication of R—Y when it is zero. The timing pulse C, occurring during the black reference level of the VIR signal, is one such time during which no color is being received and at that time the R—Y output of the detector 22 is applied to a storage circuit 30 which in turn maintains it at the reference input of the differential amplifier 28. The time constant or delay of the storage circuit 30 depends upon the makeup of the VIR signal. In the proposed signal shown in FIG. 1A since the black reference level occurs after the chrominance level, the storage time of circuit 30 would have to be approximately one vertical interval (less the 36 microseconds that the chrominance reference preceeds the black level reference), whereas if the black level reference preceeds the chrominance as shown in the VIR signal format of FIG. 1B, the delay of storage circuit 30 need only be approximately several microseconds since the black level reference is immediately adjacent to and before the occurrence of the chrominance reference.

Thus, the reference signal is applied to the reference input of the differential amplifier 28 and then during the time when the chrominance reference portion of the VIR signal is present the switch 26 is closed, this being indicated by a timing pulse a being applied to the switch. The difference, if any, that exists between the R—Y output at this time and that which existed during the black level reference time is applied to a storage circuit 24 as a differential signal which in turn is applied to the voltage controlled phase circuit 20 to shift the phase of the subcarrier oscillator until this difference in the R—Y output is reduced to zero.

For the control of the saturation of chroma gain of the receiver, the same circuit elements may be employed. The differential amplifier 34 is shown responding to a reference level which could be obtained in the same manner as shown for the hue control circuit just described or may be obtained by the alternate embodiments shown in FIGS. 3 and 4, to be described below. Thus, the reference input to differential amplifier 34 is merely indicated by receipt of a reference level which as described for the hue circuit would be obtained during the black level reference portion of the VIR signal and stored until the loop is closed by the switch 36 during the chrominance reference portion of the VIR signal. Thus, any difference between the blue signal during the black level reference portion and the chrominance reference portion is applied to the voltage controlled gain input terminal of chroma amplifier 16 until the blue output of the matrix amplifier 13 during the chrominance reference portion is identical to the blue output level during the black level reference portion of the VIR signal.

It will be noted that chroma amplifier 16 adjusts the level of the B—Y signal and that the output of matrix amplifier 13 produces the blue signal which, of course, is the difference between the B—Y and Y inputs to amplifier 13. Since any adjustment of the picture control to change the Y level with accordingly change the output of the blue level, the entire saturation control circuit is dependent upon the level of the luminance signal and as the picture control is changed, the chroma gain is changed accordingly and a true picture control with correct chroma and precise chroma tracking of the luminance is obtained.

While the embodiment of FIG. 2 has been referred to as the preferred embodiment, for many television receivers the embodiment of FIG. 3 might be preferable. In this Figure a form of AC coupling is employed, wherein the zero reference is translated to that which is particularly suitable as the operating point of the different amplifier 28. In the embodiment of FIG. 3 the capacitor 40 performs the storage function of storage circuit 30 and instead of the R—Y signal being applied to both input terminals of the differential amplifier 28, only the change in the value of this signal from the first interrogation of the VIR signal during the black level reference interval to the second interrogation during the chrominance reference interval appears as the differential input of this amplifier. The second input to the amplifier 28 is an arbitrary reference voltage as shown in the Figure. Many differential amplifiers may require an input voltage level different from the voltage representing the zero R—Y output from the detector 22. For example, if the detector 22 zero output voltage during the presence of the black level reference is 12 volts, (the switch 32 being closed during this time so that the reference voltage is applied to the first input terminal and also to the right hand plate of capacitor 40) but the desirable quiescent operating point for amplifier 28 is 8 volts, then the reference voltage is chosen as 8 volts. A voltage of 4 volts therefore appears across capacitor 40. This 4 volts is stored by the capacitor and represents a charge on the capacitor when the switch 26 is closed during the chrominance reference interval of the VIR signal. During the chrominance interval, if the R—Y signal differs from 12 volts, say 12.1 volts, this will initially cause 8.1 volts to appear at the upper terminal of the differential amplifier and the 0.1 volt differential is the error signal which is amplified and applied through the correction loop to the voltage controlled phase shifter 20 to reduce this error signal to zero.

If the 12 volts black level output of the R—Y detector in the above illustration should drift to say 13 volts, the additional one volt is taken up by the capacitor. That is, the voltage across the capacitor would change from 4 volts to 5 volts.

In both the embodiments of FIG. 2 and FIG. 3 the R—Y output of the detector 22 is utilized during the black reference interval to establish the zero reference for the hue control circuit, and it is the differential from this zero reference, if any, during the chroma reference interval that is applied to the control loop to correct the setting of the hue of the receiver. While the hue correction loop is illustrated, it is understood that each of the embodiments of the present invention is also applicable to the saturation correction loop.

In FIG. 4 there is shown an embodiment of the invention employing AC coupling much like the circuit shown in FIG. 3, but here a DC amplifier 29 is utilized instead of the differential amplifier 28. The placement of the switch 26 is shown differently merely to illustrate that the positioning of this device is not critical to the operation of the circuit. Once again switch 32 is operative during the black level reference portion of the VIR signal to establish a zero reference across capacitor 40 in combination with the R—Y output of the detector 22. When switch 26 is closed during the chroma reference interval it is the change in R—Y or the differential from the zero reference that is amplified as the error voltage. The adjustment of hue or saturation is thus complete when the error voltage is reduced to zero.

The embodiment of FIG. 4 suffers since the circuit performance is subject to any drift in the reference voltage itself. The embodiments of FIGS. 2 and 3 are not subject to this infirmity since any drift in the reference will appear at both inputs to the differential amplifier and cancel.

It should be noted from the foregoing description that more complete utilization of the VIR signal is employed by the present invention over the teachings of the prior art. By utilization of the black level reference interval of the VIR signal an updated reference is obtained so that automatic hue and saturation control is realized without reliance on drift-free circuit elements. Furthermore, the reference is one that is correct as transmitted. The black level reference for both control loops is obtained automatically and therefore no initial setup procedures are required. Also since the chroma gain adjustment to correct for proper saturation setting is a function of the setting of the picture control, a properly operative picture control is realized by the mere adjustment of the contrast desired. Not only will the chroma gain properly track the contrast setting but also the chroma level is correct as transmitted. Of course, a preference control can always be provided for so that tracking is still realized with the desired chroma level instead of the correct level transmitted by the VIR signal.

Variations and modifications in the circuit shown will occur to those skilled in the art, and it is intended that the foregoing examples of the invention are not taken as limiting the scope of the coverage sought but that such scope be determined only by the appended claims.

What is claimed as new and desired to be secured by Letters Patent of the United States is:

1. In a color television receiver an automatic hue control circuit responsive to a VIR signal included in the broadcasted video wave and containing a chroma reference portion of such phase that one color difference signal is zero and another portion having zero chroma content, said automatic hue control circuit comprising:
means responsive to said VIR signal a first time during said another portion to establish a hue null reference for said automatic hue control circuit,
means responsive to said VIR signal a second time during said chroma reference portion to recognize a difference indication, if any, between said zero color difference signal and said hue null reference, and hue control means responsive to said difference indication to control the hue setting of the receiver until said difference indication is reduced to zero.

2. In a color television receiver an automatic chroma control circuit responsive to a VIR signal included in the broadcasted video wave and containing a black level reference portion and a chroma reference portion of such phase that one color difference signal is zero, said automatic chroma control circuit comprising:
means responsive to the chroma information in the received video signal to produce an output indicative of said one color difference signal,
means responsive to said output during said black level reference portion to establish a hue null reference for said automatic chroma control circuit,
control means for controlling the hue of the image displayed by said color television receiver, and
means activating said control means for the period of receipt of said chroma reference portion, said control means being responsive to any difference between said output and said hue null reference during said period to adjust the hue setting for said receiver until any such difference is reduced to zero.

3. The invention recited in claim 2 wherein said means responsive to said output during said black level reference portion includes storage means and first switch means activated during said black level reference portion.

4. The invention recited in claim 3 wherein said control means includes a differential amplifier, one input to said amplifier being said hue null reference, the other input to said amplifier being said output, such that during said chrominance reference portion hue setting for said receiver is controlled until any differential input to said amplifier is reduced to zero.

5. The invention recited in claim 2 wherein said means responsive to said output during said black level reference portion includes storage means and first switch means activated during said black level reference portion to apply said output and an arbitrary reference voltage to said storage means, the differential between said arbitrary reference voltage and said output being stored as said hue null reference.

6. The invention recited in claim 5 wherein said control means includes a differential amplifier, one input to said amplifier being said arbitrary reference voltage, the other input to said amplifier being the difference between said output during said chrominance reference portion and said hue null reference, if any, such that during said chrominance reference portion the hue setting for said receiver is controlled until any differential input to said amplifier is reduced to zero.

7. The invention recited in claim 5 wherein said control means includes a DC amplifier and said activating means includes second switch means activated during said chrominance reference portion to enable said amplifier to respond to any difference between said output and said hue null reference.

8. The invention recited in claim 7 wherein said storage means is a capacitor enabled by said first switch means to charge to the difference between said output and said arbitrary reference voltage during said black level reference portion and enabled by said second switch means to pass to said DC amplifier any difference between the stored hue null reference and said output during said chrominance reference portion.

9. The invention recited in claim 2 wherein the amplitude of said chroma reference portion relative to the luminance amplitude of said chroma reference portion is such that one of the three color signals is zero, said automatic chroma control circuit further comprising:
means responsive to the chroma information in the received video signal to produce an output indicative of said one color signal,
means responsive to the one color signal output during said black level reference portion to establish a saturation null reference for said automatic control circuit, saturation control means for controlling the saturation of the image displayed by said color television receiver, and means activating said saturation control means for the period of receipt of said chrominance reference portion, said saturation control means being responsive to any difference between said one color signal output and said saturation null reference during said period to adjust the saturation setting for said receiver until any such difference is reduced to zero.

10. In a color television receiver an automatic chroma control circuit responsive to a VIR signal included in the broadcasted video wave and containing a black level reference portion and a chrominance reference portion of such phase that one color difference signal is zero and having such chrominance to luminance amplitude that one of the three color signals is zero, said automatic chroma control circuit comprising:

means responsive to said VIR signal a first time during said black level reference portion to establish a hue null reference and a saturation null reference for said automatic chroma control circuit, means responsive to said VIR signal a second time during said chrominance reference portion to obtain a first difference indication, if any, between said one color difference signal and said hue null reference and a second difference indication, if any, between said one color signal and said saturation null reference, hue control means responsive to said first difference indication to control the hue setting of the receiver until said first difference indication is reduced to zero, and saturation control means responsive to said second difference indication to control the saturation setting of the receiver until said second difference indication is reduced to zero.

11. In a color television receiver responsive to a VIR signal included in the broadcasted video wave and containing a chrominance reference portion of such phase that one color difference signal is zero, an automatic hue control circuit comprising:

detector means for detecting the color difference signals in said video wave, means responsive to the one color difference signal output of said detector means during a known zero chroma interval to obtain a hue null reference, means responsive to said one color difference signal output during said chroma reference portion to recognize the difference if any between said hue null reference and said one color difference signal, and hue control means responsive to said difference to control the hue setting of the receiver until said difference is reduced to zero.

12. In a color television receiver responsive to a VIR signal included in the broadcasted video wave and containing a chrominance reference portion of such chrominance to luminance amplitude that one color signal is zero, an automatic chroma control circuit comprising:

detector means for detecting the color signals in said video wave, means responsive to the one color signal output of said detector means during a known black level interval to obtain a saturation null reference, means responsive to said one color signal output during said chrominance reference portion to recognize the difference if any between said saturation null reference and said one color signal, and saturation control means responsive to said difference to control the saturation setting of said receiver until said difference is reduced to zero.

* * * * *